US010637990B1

(12) United States Patent
Chadha et al.

(10) Patent No.: US 10,637,990 B1
(45) Date of Patent: *Apr. 28, 2020

(54) CALL CENTER LOAD BALANCING AND ROUTING MANAGEMENT

(71) Applicant: UIPCO, LLC, San Antonio, TX (US)

(72) Inventors: Bipin Chadha, San Antonio, TX (US); Lambros Petropoulos, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,138

(22) Filed: May 24, 2019

Related U.S. Application Data

(63) Continuation of application No. 15/642,635, filed on Jul. 6, 2017, now Pat. No. 10,306,068.

(51) Int. Cl.
*H04M 3/51* (2006.01)
*H04M 3/523* (2006.01)

(52) U.S. Cl.
CPC ......... *H04M 3/5234* (2013.01); *H04M 3/523* (2013.01); *H04M 3/5175* (2013.01); *H04M 3/5232* (2013.01); *H04M 3/5237* (2013.01)

(58) Field of Classification Search
CPC .. H04M 3/5175; H04M 3/523; H04M 3/5232; H04M 3/5234; H04M 3/5237
USPC ...................................................... 379/265.02
See application file for complete search history.

(56) References Cited

U.S. PATENT DOCUMENTS

| 10,306,068 | B1 * | 5/2019 | Chadha | H04M 3/5234 |
| 2013/0251137 | A1 * | 9/2013 | Chishti | H04M 3/5158 |
| | | | | 379/265.11 |
| 2015/0215463 | A1 * | 7/2015 | Shaffer | H04M 3/5232 |
| | | | | 379/265.1 |

FOREIGN PATENT DOCUMENTS

EP          1337121 A1 *  8/2003  ............ H04W 16/06

* cited by examiner

*Primary Examiner* — Harry S Hong
(74) *Attorney, Agent, or Firm* — BakerHostetler

(57) ABSTRACT

Systems and methods solve functions relating to load balancing, call routing, and costs in call center networks for specific parameters. Systems and methods can also utilize machine learning to provide specific parameters relating to load balancing, call routing, and costs in call center networks.

20 Claims, 7 Drawing Sheets

CALL CENTER LOAD BALANCING AND ROUTING MANAGEMENT

INCORPORATION BY REFERENCE

This application is a continuation of U.S. patent application Ser. No. 15/642,635, filed Jul. 6, 2017. This application is related by subject matter to U.S. Patent Application Nos. 62/140,748, filed Mar. 31, 2015; Ser. No. 15/426,874, filed Feb. 7, 2017; 62/292,979, filed Feb. 9, 2016; 62/301,351, filed Feb. 29, 2016; Ser. No. 15/440,029, filed Feb. 23, 2017 and Ser. No. 15/066,132, filed Mar. 10, 2016, which are incorporated herein by reference in their entirety.

TECHNICAL FIELD

The subject application generally relates to call center management, and more particularly relates to routing calls in call centers.

BACKGROUND

The handling of customer, prospect, or third party calls by organizations is imperative to their reputation, delivery of products, and retention and growth of customer base. Effective call management can even drive sales, both by maintaining or increasing satisfaction and by discovering opportunities to establish or deepen relationships beyond an initial call issue.

Many organizations using call centers use a queuing method, which suffers from many drawbacks pitting utilization against performance. Underutilized call centers waste organizational resources, but over-utilized call centers will lag in performance (e.g., time to response, time to resolution) to the frustration of callers.

United Services Automobile Association developed event- and agent-based call routing to advance beyond earlier queueing methods. New load balancing algorithms and propensity models were developed to deepen industry understanding of call routing solutions and drive interaction with callers.

However, a number of competing parameters still exist in all call routing techniques. Call center networks and their subordinate entities would benefit from additional techniques for solving, utilizing, and reconciling disparate call and routing parameters.

SUMMARY

In an embodiment, a method comprises receiving loading parameters associated with a call center network which has a call center network architecture. The method also comprises identifying at least one of a load balancing algorithm or a routing algorithm based on the call center network architecture and determining solution parameters for the at least one of the load balancing algorithm or the routing algorithm based on the loading parameters. The method also comprises solving a penalty function based on the loading parameters, the call center network architecture, and the solution parameters.

In an embodiment, a system comprises a call data module configured to receive call center performance data associated with a call center network which has a network architecture. The system also comprises a function module configured to identify a load balancing algorithm, a routing algorithm, and a penalty function based on the network architecture. The system also comprises a solver module configured to solve deviations based on the penalty function based on a network load and parameters associated with the load balancing algorithm and the routing algorithm.

In an embodiment, a system comprises means for receiving loading parameters associated with a call center network which has a call center network architecture. The system also comprises means for identifying at least one of a load balancing algorithm or a routing algorithm based on the call center network architecture and means for determining solution parameters for the at least one of the load balancing algorithm or the routing algorithm based on the loading parameters. The system also comprises means for solving a penalty function based on the loading parameters, the call center network architecture, and the solution parameters.

Additional and alternative aspects will be apparent on review of other portions of this disclosure.

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Figure 1:
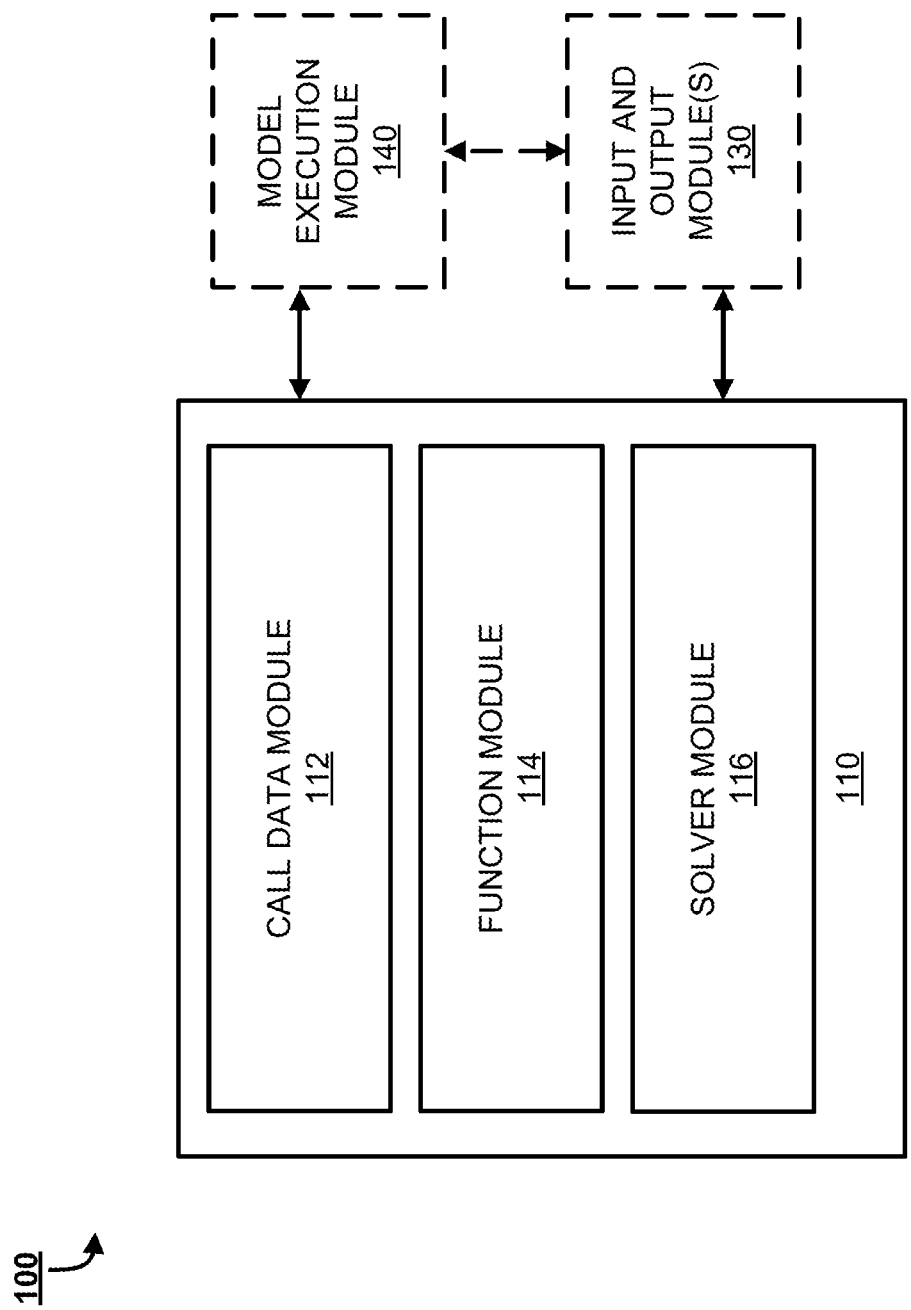
FIG. 1 illustrates a block diagram of an example system of the disclosure.

The subject disclosure provides systems and methods for generating and calculating solutions for functions solving a variety of variables related to call centers. In embodiments, call network models and/or center models can be used to develop functions for finding maximum, minimum, or target values for particular parameters which impact load balancing between call centers and/or call routing within call centers. Further, machine learning systems and methods can be trained to obviate the need for solving objective functions or calculating models according to parameters, which allows call centers to resolve call routing solutions faster and more efficiently. Parameters determined can facilitate load-balancing between call centers, then perform routing to one or more member service representatives (MSRs, e.g., call respondents) within the call centers.

Members, customers, prospects, and others contact call centers for customer support in tremendous volumes. To handle these volumes, organizations providing customer support by call center organize call center networks. The call center networks can include one or more call centers. In multi-center networks, some centers may be run by the organization itself, and other centers may be provided by one or more third party organizations. When the common customer service line is called, initial routing decisions are made by a load balancer such as an interactive voice response system (IVR) to select one or more call centers which the call may be directed toward. Once the call is assigned to a particular call center (or subset of call centers), routers within the call center direct the call to a particular respondent at a call center.

Call center respondents collect information about the call and from the caller and use the collected information to develop records and resolve caller issues. Call respondents deal with a variety of calls having different characteristics. Calls can have complexity, which can relate to the difficulty of issues, number of issues, number of steps taken to handle an issue, et cetera. Call complexity can also be described in terms of linearity, which relates to whether the call remains on and proceeds through a single issue, or if the call transitions abruptly between issues or topics, or portions of a single issue (e.g., goes back to previously-discussed aspect, responds to questions with unrelated questions). Because of the wide distribution of possible call characteristics and call distributions, efficiently managing call centers is a challenging task. To the extent that call characteristics can be discerned before MSR interaction (such as by using automated voice prompts at IVRs or lookup of characteristics associated with a calling number), these characteristics are used with load balancing algorithms and/or routing algorithms utilized by load balancers (including but not limited to IVRs) and routers respectively.

In an embodiment, call characteristics can be related to a type of call. Types of calls in a financial institution and/or insurance environment may include, e.g., calls relating to: funds on hold, savings inquiries, insurance policies, new client enrollment, existing client relationship management, client histories, fees, balances, pending transactions, claims, fraud reports, parties authorized to access an account, et cetera.

This process involves at least one load balancer and routers at different logical points within call center networks and call centers. A variety of router types are available (e.g., Avaya®, Cisco®) to manage call volume. Load balancers utilize load balancing parameters which can be adjusted to modify the logic for directing incoming calls to particular call centers or groups of MSRs. Routers serving the call centers or groups of MSRs utilize routing algorithms which can adjust routing parameters as call volume changes to operate efficiently. As noted above, load balancing is typically conducted by routing calls among multiple call centers (e.g., a call center network may have 10 call centers, or more, or less) using multiple load balancing logic for routing (e.g., 3 techniques, or more, or less), and one or more types of routers can then route its share of the balanced load to MSRs based on a variety of parameters (e.g., call characteristics, MSR skill, MSR workload or productivity). Each load balancing logic and/or routing logic may have a plurality of parameters (e.g., 44-48 parameters, or more, or less) used to solve load balancing and routing decisions. The logic chosen under particular conditions may also depend on the same or different parameters.

In an example, a call to an organization 800-number is received by an IVR. The IVR gathers information quickly using a machine while monitoring load on call centers. Such monitoring includes tracking the load, resources, and commitments of each call center in realtime. This can include determining a number of queues or queue size, a number of MSRs, actual or average handling times by call center, and the number of available MSRs at each call center. This can be used to calculate (or in conjunction with a separately-calculated) minimum estimated delay (MED). Call centers which are overloaded may be "escalated" among other call centers by the load balancing algorithm to assist with diverting traffic away from the escalated call centers until they are no longer overloaded. In embodiments, the lowest MED can be used as a solution to a load balancing decision.

Continuing the above example, the load balancer provides the call to a router associated with the selected call center. The router seeks to deliver the call to a MSR with skills identified to match the call characteristics, caller account, or other qualitative variables, as well as quantitative variables such as balancing utilization across MSRs at the call center (e.g., number of calls processed per MSR, number of particular types of calls processed by MSR number of minutes of call processing per MSR). In this regard, all MSRs of a call center can be analyzed as a group, or subsets of MSRs can be analyzed (and considered for routing) based on MSR characteristics such as experience level, known skills (e.g., product lines, types of questions, languages, troubleshooting), productivity (e.g., throughput and speed), client relationship, et cetera. Using one or more routing algorithms and these parameters, the call is routed to an MSR for handling.

Desired load balancing and routing parameters (e.g., optimized for response speed or efficiency; dependent on particular parameter values or constraints; et cetera) are dynamically dependent on incoming call volume and the distribution of issues or requisite skills related to the calls. In this regard, load balancers may seek to direct calls to call centers which have a high likelihood of matching call characteristics, and/or Voice Over Internet Protocol (VoIP) routers may seek to direct calls to MSRs with particular skills or who are otherwise suited to work with the caller. Caller and call attributes can be matched to MSRs. If the matched MSRs are not available, queuing techniques place the call in a waiting queue for a specified amount of time to permit the call time to reach its closest-matched MSR(s). This wait time is one parameter considered in load balancing decision logics. When dealing with multiple call centers, many MSRs, different routers, differing proprietary routing techniques within a single network, and a wide range of parameters, "brute force" calculation for call routing becomes inefficient.

To overcome these limitations and provide more efficient routing, techniques herein can be utilized to solve for particular parameters or constraints, or optimize routing parameters.

Parameters herein can be those used in analyzing and managing call centers, load balancing, and call routing, including, but not limited to, minimum expected delay (MED), forecasting range, and others. In embodiments, parameters can be set to relative or absolute scales, represented by numbers (e.g., 0 to 500), which may be the same or different for two or more parameters. Parameters can include details about groups of calls—call volume, rate, distribution, et cetera—or individual calls and callers—caller, accounts, issues, complexity, linearity, et cetera. Parameters are dynamic and may be interrelated. In an embodiment, a "rolling" parameter can define how long a call remains in a queue awaiting a particular MSR (or class of MSRs with a particular skill, experience level, or relationship) before being passed into a queue with a faster response time or broader group of MSRs.

Parameters are, in part, related to call center network architecture. Call center network architecture describes the components and function of the call center network, to include the load balancer, routers, call center resources (and subordinate resources such as those of MSRs), and data, voice, or other links therebetween, as well as supporting infrastructure such as gateways or servers containing software and/or storage or databases related to call center operations and records. The call center network architecture can include hardware or software for accessing existing or creating new customer records or notes to those records, and can perform searching, matching, filtering, et cetera, of different records and data related thereto.

A variety of functions are described herein. In an embodiment, an objective function can be a function that represents calculated call center network performance (or particular aspects of performance) based on call center network architecture, algorithms, parameters, and loading. In an embodiment, an objective function can be a function to solve for algorithm parameters in view of call center network architecture, algorithms, loading. An objective function can contain penalty variables, values, or sub-functions to integrate penalty considerations in a single function. In alternative or complementary embodiments, a separate penalty function can be evaluated before, after, or during evaluation of an objective function. The separate penalty function can be dependent on or interrelated with the objective function in such embodiments.

As used herein, a "call center network" includes one or more call centers having one or more MSRs who respond to one or more methods of contact. One or more call centers in the call center network can be operated by an organization which parties contact via the call center, and/or one or more call centers within the call center network can be operated by a third party on behalf of the organization. While aspects herein generally refer to "voice calls" it is understood that the techniques in here can be used in conjunction with other or multiple methods of contact, including but not limited to e-mail, text messaging (e.g., short message service), public or private social media messaging (e.g., posting, direct messaging), chat messaging, and others.

Now referring to the drawings, wherein like reference numbers refer to like elements, FIG. 1 illustrates an example system 100 for solving load balancing and routing parameters for calls to call centers. System 100 includes solution module 110, input/output module 130, and model execution model 140. Solution module 110 receives performance data associated with a call center network and determines solution parameters to assist with load balancing, call routing, and cost containment. In embodiments, the solution parameters may maximize or minimize one or more parameters alone or in combination, or may target ranges, constraints, or values for one or more parameters.

Solution module 110 includes call data module 112, which receives performance data for analysis which defines or relates to parameters. Performance data can be received from a call center network in realtime or in a delayed or batched manner reflecting historical data, which can be recent or distant. In embodiments, performance data is received from one or more simulations modeling at least one call center network. These simulations can be based on actual, projected, or arbitrarily modeled conditions relating to volumes of calls, which can include characteristics of the calls as well as the call centers and MSRs within the call center network. Characteristics can be dynamic; for example, call characteristics can change over time (e.g., with more complex calls occurring outside traditional business hours) as can call center characteristics (e.g., MSRs improve proficiency over time).

Performance data can be received from performance module 140, which can include a simulation or model of a call center network, a database of stored or historical performance data, and/or an interface to realtime performance data. In embodiments, the real or simulated call center network can include multiple disparate call centers using multiple different load balancing and/or routing algorithms which are provided by or represent one or more load balancers and one or more routers, including different router types.

Solution module 110 can also include function module 114. Function module 114 analyzes performance data alone or in conjunction with other functions or set parameters to determine one or more load balancing algorithms and/or routing algorithms for handling calls or call volume. The load balancing algorithm may be arbitrarily specified, selected from a database or library of algorithms, or dynamically adjusted to reflect particular solutions or the behavior of simulated networks. In an embodiment, one or more load balancing algorithms or routing algorithms are developed based on the performance data and/or routing parameters, through generation of a new algorithm or modification of an existing algorithm. In an embodiment, a new algorithm can be provided by a user for testing in a model or simulation in a manner which does not disrupt production environments as might occur if the new algorithm provided was tested in a real-world/non-simulated call center network. The selected load balancing algorithm can assist with directing one or more incoming calls to a particular portion of a call center network for action.

Solution module 110 can also include a penalty module 114. Penalty module 114 analyzes call center network information and/or performance data and selected algorithms to identify a penalty function for use with a particular call volume and/or call center network. The penalty function may be arbitrarily specified or selected from a database or library of penalty functions based on the call center network information and/or other parameters. In an embodiment, the penalty function is developed based on call center network information, call center information, MSR information, performance data, and/or load balancing or routing parameters, through generation of a new function or modification of an existing function. In an embodiment, a new function can be provided by a user for testing in a model or simulation. The selected penalty function can be used to assist with efficient implementation of load balancing and routing by measuring costs or imposing penalties based on values or ranges of call center or MSR utilization, productivity, opportunity cost (e.g., chance of upselling or cross-selling, risk of unsatisfied customer, et cetera. In embodiments, the penalties can be used to modify solutions determined by solution module 110 which otherwise fail to account for costs or other consequences associated with implementation of the solutions. In this manner, underutilization of call centers and MSRs can be avoided, call centers or MSRs can be prioritized according to absolute or relative costs, et cetera.

A penalty function herein can be multidimensional. One or more embodiments can include dimensions such as utilization rate, time(s) to servicing of calls, abandonment rate, capture of high-propensity calls or callers (e.g., correct routing, conversion of opportunity), and/or attribute matching (e.g., how often attributes are properly matched between caller and MSR in routing; how often matched attributes work as intended). In embodiments, a penalty function can be a penalty summation objective function.

Solution module 110 also includes solver module 118. Solver module 118 can solve one or more of the load balancing algorithm, the routing algorithm, the penalty function, and/or other functions or equations for particular parameters, or in accordance with particular values for those parameters (e.g., maximization, minimization, range, specified value). Solution module 110 can utilize linear programming, quadratic programming, combinatorial programming, or other techniques to perform constrained or unconstrained multivariable parameter development. In embodiments, solver module 118 solves a penalty function in view of a call center network architecture including its load balancing and routing algorithms and performance targets or goals associated with the call center network. In embodiments, solver module 118 solves an objective function, which may or may not contain penalty aspects. In some embodiments, solutions for either a penalty function or an objective function (whether including penalty aspects or not) can be based on past, present, or predicted performance of a call center network or call center network simulation.

System 100 can also include input/output module(s) 130. Input/output module(s) 130 can be used to provide information to, or receive information from, solution module 110, and serve as an interface between in solution module 110 and performance module 140 (or real or simulated call center networks related thereto). In an embodiment, input output module(s) 130 can provide one or more of an algorithm and/or determined parameters to a real-world call center network after determining parameters according to a desired solution.

Figure 2:
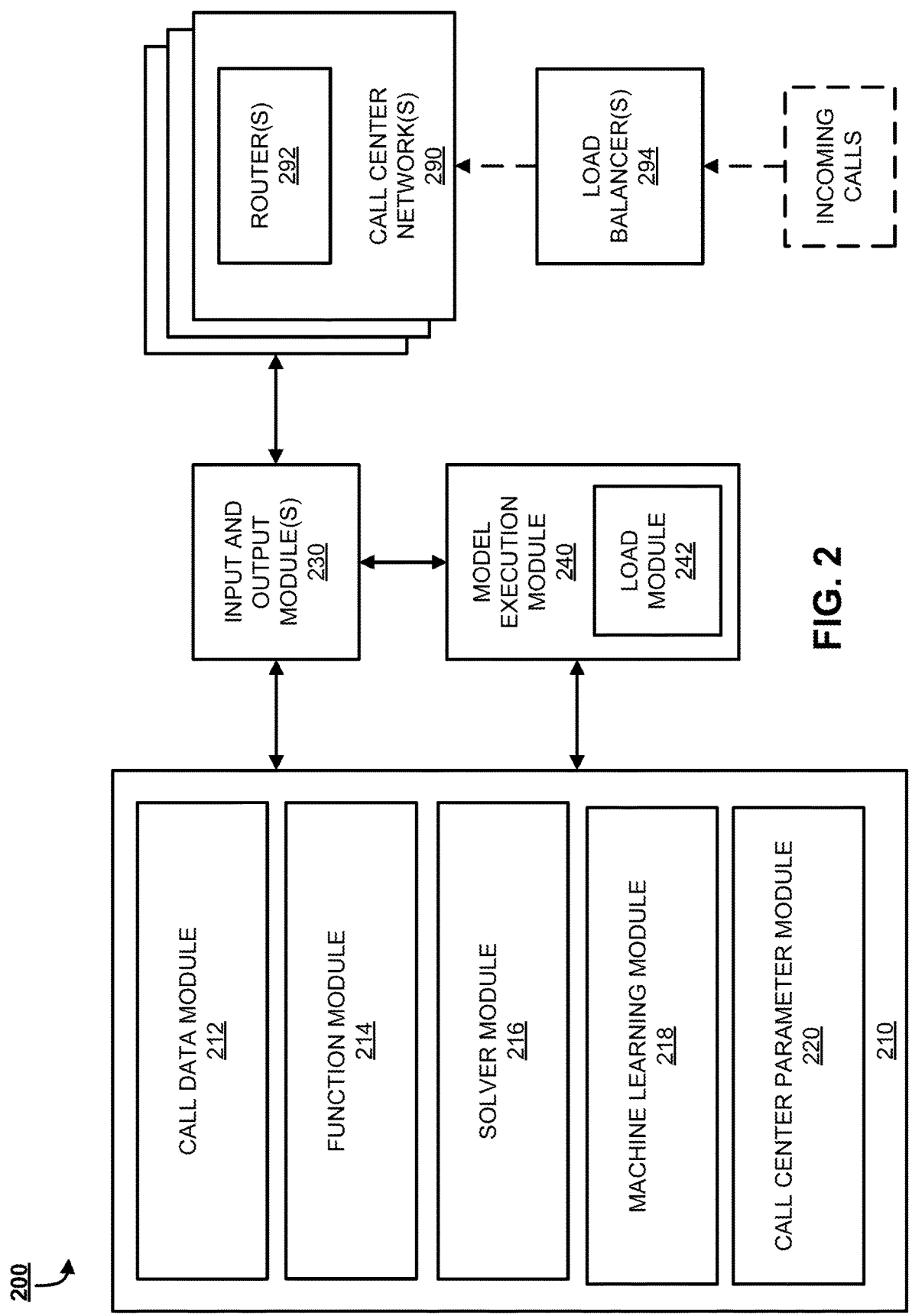
FIG. 2 illustrates a block diagram of another example system of the disclosure.

FIG. 2 illustrates an example system 200 including solution module 210, input/output module 230 (which may be two or more input/output modules, model execution module 240, and one or more call center network(s) 290.

Solution module 210 includes call data module 212, which receives performance data for analysis which defines or relates to parameters. Solution module 210 can also include a function module 214, which can determine, modify, or generate functions such as a load balancing, a routing function, and/or a penalty function. Load balancing and routing functions which are determined, modified, or generated can replicate load balancing or routing algorithms used by load balancers or routers, may represent outcomes of load balancers or routers based on algorithms used and parameters, or both. Solution module can also include a solver module 216 configured to solve one or more functions, algorithms, or equations, including but not limited to those provided by function module 214, according to one or more parameters or variables. In some embodiments, solver module 216 can provide solutions for either a penalty function or an objective function (whether including penalty aspects or not). In some embodiments, such solutions can be based on past, present, or predicted performance of a call center network or call center network simulation.

In embodiments, solver module 210 can utilize an objective function having load balancing, routing, call center, and penalty parameters. In further embodiments, call center performance can be assessed using the objective function given particular parameters, and the objective function can assess deviation from a baseline, a previous solution, or particular targets. In embodiments, targets for particular outcomes—such as MED, abandonment rate, call center utilization, MSR utilization, et cetera—can be based on absolute values (e.g., MED less than 45 seconds, MSR utilization above 360 minutes per day, less than 50 abandonments), arbitrary metrics (e.g., 0-500 scores for categories), relative values (e.g., specialized MSR utilization 30 minutes above non-specialized MSRs), percentages (e.g., abandonments under 5%, 95% of MSRs above 6 calls per hour), or combinations thereof. In an embodiment, the objective function can be a penalty function which determines error or deviation rates for particular solution parameters within a call center network architecture given loading conditions.

In an embodiment, a call center's performance can be assessed by summing deviations from targets (e.g., minimizing an error) in specific categories of parameters or values derived or calculated from parameters based on an objective function and performance based on selected load balancing, routing, and/or other parameters. In an embodiment, measurable goals can be provided for abandonment rate, utilization rate, response speed, propensity capture rate, and routing specificity. These characteristics can also have sets of goals based on call center, call characteristic, MSR, et cetera.

In an embodiment, abandonment can have particular goals for particular call characteristics. For example, a target abandonment rate may be below 1% for a particular skill (e.g., insurance enrollment) and 2% for another skill (e.g., balance inquiries), and an abandonment error rate can be the percentage above target. In embodiments, the error rate can be a weighted average to account for call volume or MSR quantities by skill or characteristic.

In an alternative or complementary embodiment, utilization rate can have a particular goal for particular call characteristics. Utilization rate can have one or more targets for each MSR group, common skill set, call center, et cetera. In an embodiment, a utilization rate can include having, at any one time, 70%, 75%, 80%, 85%, or more, or fewer, MSRs in a given call center network or call center busy at a particular time. In an embodiment, the error rate can be calculated from percentages or proportions by which actual utilization falls below target utilization.

In an embodiment, response speed (e.g., average response speed) can be set to a target response rate for all calls or for calls having particular characteristics. In an embodiment, the target time for a call to reach an MSR is 30 seconds or less. In an embodiment, the target time for a call associated with a particular skill, or having a particular characteristic (e.g., type of account, specific caller, propensity for deepening relationship) is 25 seconds or less. The time can be any value—10 seconds, 45 seconds, 120 seconds—and various granularity can be based on particular response times for all or some of the calls. In an embodiment, an error rate can be a percentage of calls which exceed the target response speed (e.g., two calls out of 50 over target response time is a 4% error rate), or a deviation from a goal percentage for calls exceeding the target response speed (e.g., 14% of calls exceed target response speed where 5% is acceptable results in a 9% error rate). In an embodiment, an error rate can be an absolute or weighted average percentage above the target error rate (e.g., 36 second response for 30 second target is 20% error rate).

In an alternative or complementary embodiment, a propensity capture rate can have a target for number of calls with a propensity for relationship deepening or new/additional product sales routed to a particular call center, group of MSRs, or MSR. Propensity rates or likelihoods can be values calculated based on general call parameters and caller- or call-specific parameters which statistically relate to a likelihood of selling a product, enrolling a customer, or otherwise deepening a relationship. In an embodiment, an error rate can be a percentage of calls (or amount above an allowable percentage of calls) which are routed to a MSR who is not characterized for high propensity calls, not characterized for particular products or lines, or outside an organization call center but located a contracted third party call center (e.g., if organization wants employees handling opportunities to deepen relationships rather than contractors or third parties). For example, if 2% of calls go to a third-party call center, or 12% of calls go to a MSR who is not characterized for deepening where 10% is the acceptable rate, the error rate can be 2%.

In an alternative or complementary embodiment, a routing specificity rate can have a target for a percentage of calls routed to a MSR identified by the routing algorithm in a first iteration. In embodiments, this can provide a goal of "attribute matching." For example, the routing algorithm may determine one or more MSRs with the appropriate skills, relationships, experience, et cetera. However, the queue for these MSRs may time out at 100 seconds and roll to another iteration of the routing algorithm or to a broader general queue. If 5% of the callers are rolled or fail to connect with a specifically targeted MSR or group of MSRs, or if 15% of callers fail to connect with a specific target MSR type and 10% is acceptable, the error rate is 5%.

The error rates from one or more of the above metrics, or others described herein, can be summed to determine an error rate associated with a particular parameter solution. The parameter solution may be for a load balancing algorithm. The parameter solution may be for a routing algorithm. The parameter solution may be for both and/or other algorithms or functions. By summing the rates, parameter solutions can be compared, both in general and with respect to particular load conditions (e.g., call volumes/distributions). In an embodiment, the total error rate, summed between relevant metrics, can be the penalty associated with a solution. In an embodiment, the penalty can be minimized.

Solution module 210 also includes machine learning module 218. Machine learning module 218 is configured to be trained by solution module 210, and/or data from model execution module 240 and/or call center network(s) 290 indicating performance based on parameters. Machine learning module 218 can be allowed to define its own rules or self-generated/dynamic scoring based on patterns or analysis of volumes of data.

Either immediately or after training, machine learning module 218 may selectively bypass solver module 216 to develop or provide parameters for load balancing or routing algorithms, in accordance with one or more penalty functions. Selecting to bypass the mathematical techniques performed by solver module 216 can be based on a number of variables, including but not limited to solution complexity, rates of change in performance or parameters, available system resources (memory, processor time, bandwidth), latency, atypical patterns (e.g., unusually high or low call volumes for particular conditions), et cetera. In an embodiment, machine learning module 218 may bypass solver module where performance falls below particular goals (or error rate/penalty increases above a threshold) but either due to complexity or dynamic load solver module 216 cannot return parameter solutions in a desired time (or at all). In an embodiment, machine learning module 218 may provide most or all solutions as opposed to solver module 216.

Solution module 210 can also include call center parameter module 220. Call center parameter module can provide parameters developed by solver module 216 and/or machine learning component 218 to call center network(s) 290 or elements subordinate thereto (e.g., individual routers or call centers). Provisioning can be conducted continuously, periodically, or on-demand.

System 200 can also include model execution module 240. Model execution module 240 can run models or simulations of call center networks or subordinate elements thereof. Model execution module 240 includes load module 242, which can simulate loads on modeled call center networks. Simulated loads can fall below, exceed, or mimic real-life measured loads. In real-life call center environments, call volume distributions and related characteristics vary all the time. Therefore in models or simulations, loads can vary based on volumes of different call types having different complexities. By developing loads which are infrequent or not-yet reflected in real-world call center networks, parameters can be solved in advance of being needed, or machine learning can be trained to handle a broader range of situations. Over time, a vast number of possible scenarios can be developed based on all possible load balancing and routing combinations for call center networks, allowing parameters to be selected, solved, and in particular embodiments, optimized, maximized, or minimized to provide higher call center performance and/or efficiency.

System 200 further includes input and output module(s) 230 which can serve as interfaces between solution module 210, model execution module 240, and/or call center network(s) 290. System 200 may, in embodiments, also include one or more call center network(s) 290, which may be live call centers (production environments) for an entity associated with solution module 210 or another entity.

In practice, call center network(s) 290 can be discrete event/agent based networks of call centers utilizing different routers and linked through different load balancing distribution algorithms. Each can be subject to different or common costs and resources represented by different or common penalty summation objective functions which can be used to track and/or enforce target MSR utilization, member service index (MSI) performance (e.g., how quickly incoming calls are serviced), abandonment rates (e.g., how often call dropped without routing, MSR connection, or resolution), and capture rates (e.g., how often member with high propensity to deepen relationship or add products is routed based on propensity, and/or how often member with high propensity to deepen relationship actually does), and the numerical methods utilized to optimize the load balancing and VOIP routing parameter values.

In one aspect, a simulation provided by model execution module 240 is used to model call center network(s) 290 having multiple call centers using different router types and different load balancing decision logic paths. Load module 242 can provide dynamic loads to the simulation. The simulation can replay, measure, and track call volume distribution provided by load module 242 for different call types (and/or different skills or attributes associated with calls) among both internal and third party call centers using different router types, different load balancing algorithms, subject to different loading conditions. The simulation by model execution module 242 can handle different voice line types (e.g., VOIP, plain old telephone service (POTS), et cetera). The simulation can handle a range of MSRs and MSR skillsets, from least- to most- and multi-skilled, and considering different proficiency levels among multiple skills. MSR skill level or proficiency can also be updated by the simulation based on the speed (e.g., wait time, time to resolution) and effectiveness (e.g., whether the issue is resolved) of their call handling. The simulation provided by model execution module 242 can handle varying call priorities, from least to most urgent. The simulation allows the testing and refinement of new load balancing algorithms by observing the effects of load balancing algorithms without risking impact to real-world customer service.

Based on the simulation from model execution module 240 and/or data from call center network(s) 290 received via input and output module(s) 230, solution module 210 can provide various load balancing and/or routing parameters in accordance with target parameter values and/or penalty functions. Multiple daily solution "runs" (which can, but need not be, optimizations of particular parameters or penalty functions) are completed in embodiments to provide parameters relevant to current network conditions. In embodiments, such solution can occur periodically (e.g., every five minutes, hourly, four times daily), on-demand, based on a deviation in performance or particular parameters from the last solution (e.g., relative or absolute change from a dynamic baseline), or based on particular ranges or values of performance or parameters (e.g., relative or absolute change from a static baseline). In embodiments, input and output module(s) 230 provide real-time or near real-time parameter setting adjustments to simulations and/or call center network(s) 290 to allow for use of parameters with load balancers, routers, precision queues, et cetera.

System 200 therefore facilitates load balancing for all possible call volumes, providing desired parameters at every step or echelon of load balancing techniques providing control from the TSI point to a precision queue or skill queue. The simulation provided by model execution module 240 and functions provided by function module 214 and solved by solver module 216 (and/or provided parameters by machine learning module 218) accounts for all characteristics and parameters from initial call (or communication) contact with an edge of call center network(s) 290 (or modeled representations thereof) to precision or skill queues, member attributes, MSR attributes and proficiency, and outcomes based on the parameters and handling. All load balancing and VOIP routing factors (e.g., MEDs, headcounts, call in the skill, precision queues) are observed as actionable data for call center network(s) 290 in a manner aiding its analysis (e.g., identifiable by call center, by skill, by MSR, in various time blocks). This improves significantly over queuing techniques which do not account for variables such as different routers and/or actual call distribution (instead relying on approximations through statistical methods.

Figure 3:
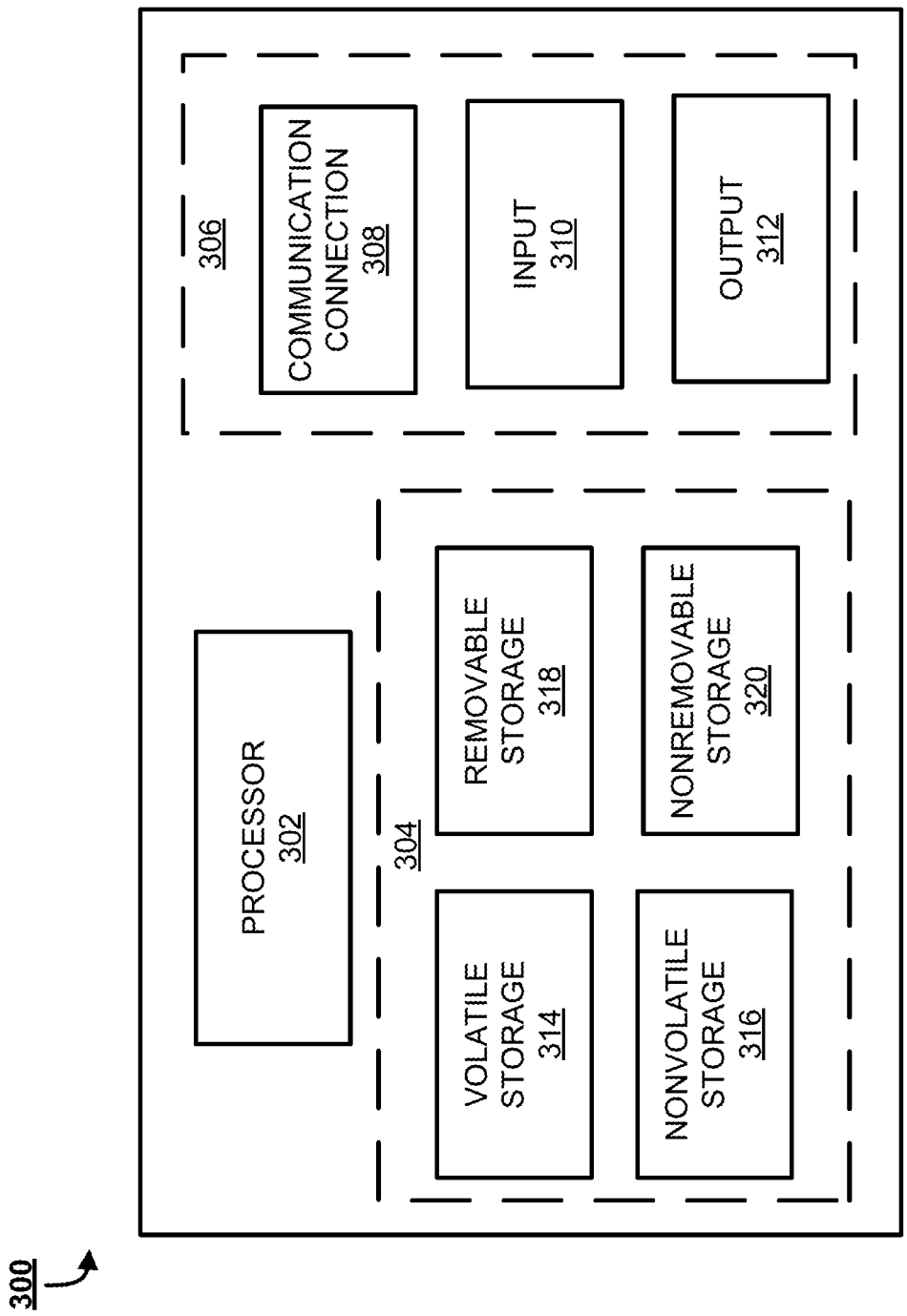
FIG. 3 is a block diagram illustrating an example implementation of a device through which the training module may be accessed.

FIG. 3 illustrates a device 300. Device 300 may comprise all or a part of modules or components herein. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of an appropriate device 300, or combination of modules or components herein, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of device 300, determining a type of broadcast message and acting according to the broadcast message type or content, as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations to map signal strengths in an area of interest.

Figure 4:
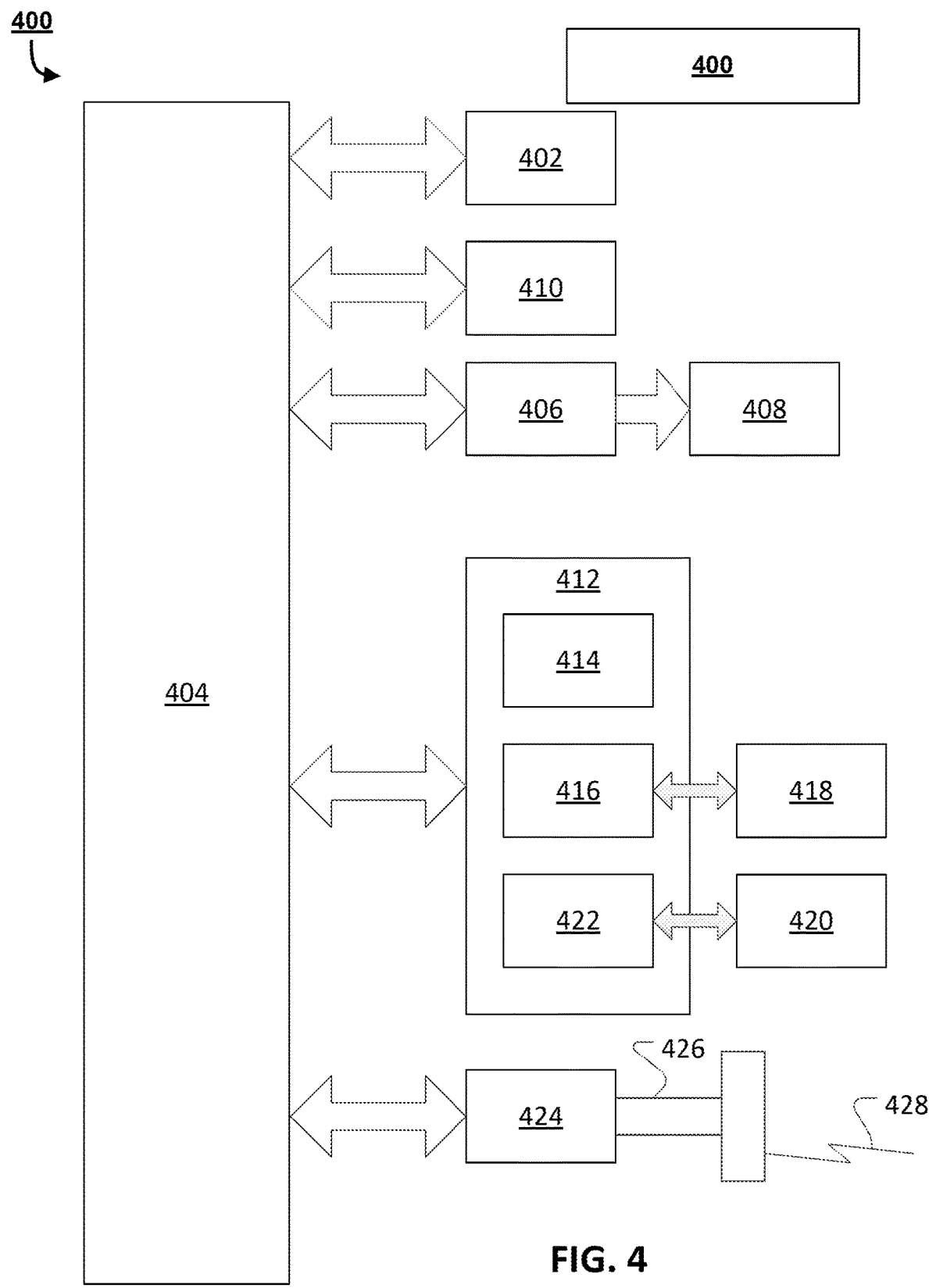
FIG. 4 is an block diagram of a computer system that be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Figure 5:
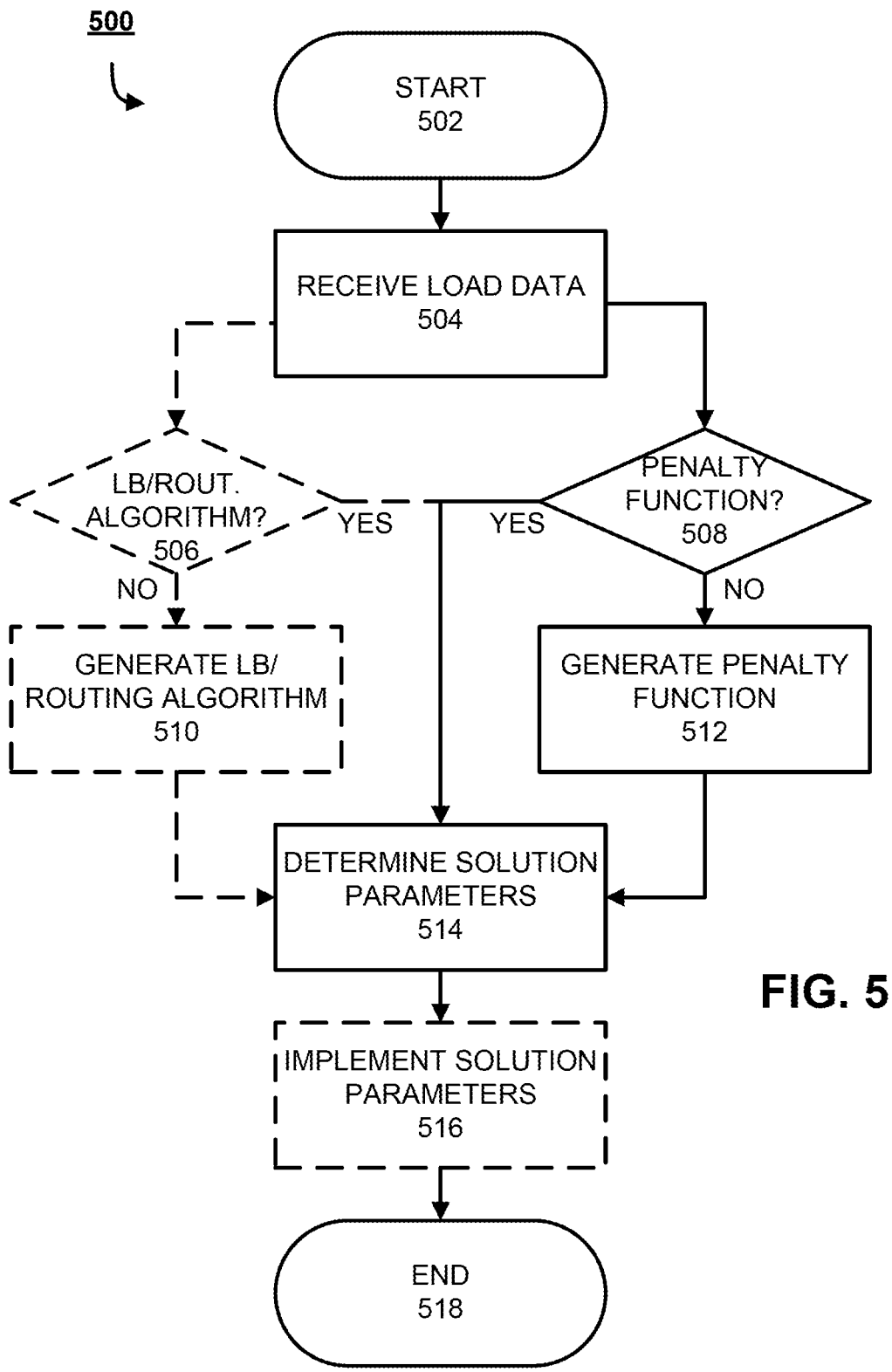
FIG. 5 is a flow chart of an example method in accordance with the disclosure.

FIG. 5 illustrates a flow chart of an example methodology 500 for developing solution parameters in call center networks. Methodology 500 begins at 502 and proceeds to 504 where call center network load data is received. Load data may be simulated using models or received from real-world call center networks. The load data can be assessed or analyzed prior to proceeding to 506/508.

In some embodiments, at 506 a determination is made as to whether a load balancing algorithm or a routing algorithm matching the call center network, simulation, and/or load data is available. If an appropriate, desired, or selected load balancing algorithm is found to be unavailable at 506, methodology 500 proceeds to 510 where a load balancing algorithm is generated (or, e.g., located, accessed, created through modification of an existing algorithm). In embodiments, such algorithms may be pre-set or known, and are utilized at 514 during solving in view of penalty functions.

At 508, a determination is made as to whether a penalty function matching the load data is available. The determination at 508 can occur concurrently, before, or after the determination at 506. If an appropriate, desired, or selected penalty function is found to be unavailable at 508, methodology 500 proceeds to 512 where a penalty function is generated (or, e.g., located, accessed, created through modification of an existing algorithm).

After generating (or otherwise provisioning) algorithms or functions at 510 and/or 512, and/or after algorithms or functions are determined at 506 or 508 (e.g., determinations return positive), methodology 500 proceeds to 514 where solution parameters are determined. This determination is made based on the load data, the load balancing algorithm (and/or other algorithms), and the penalty function. The solutions can seek to maximize, minimize, constrain, optimize, et cetera, one or more parameters associated with load data, algorithms, functions, and other variables of methodology 500.

In embodiments, after solution parameters are determined, methodology 500 can implement the solution parameters at 516 (e.g., by providing the parameters to a model or call center network). Thereafter, at 518, methodology 500 ends.

In embodiments of methodology 500, parameters can be generated without the use of load data. In this manner, parameter sets can be provided and implemented to test for some or all possible loads and collect performance data for the sets of calculated loads.

Figure 6:
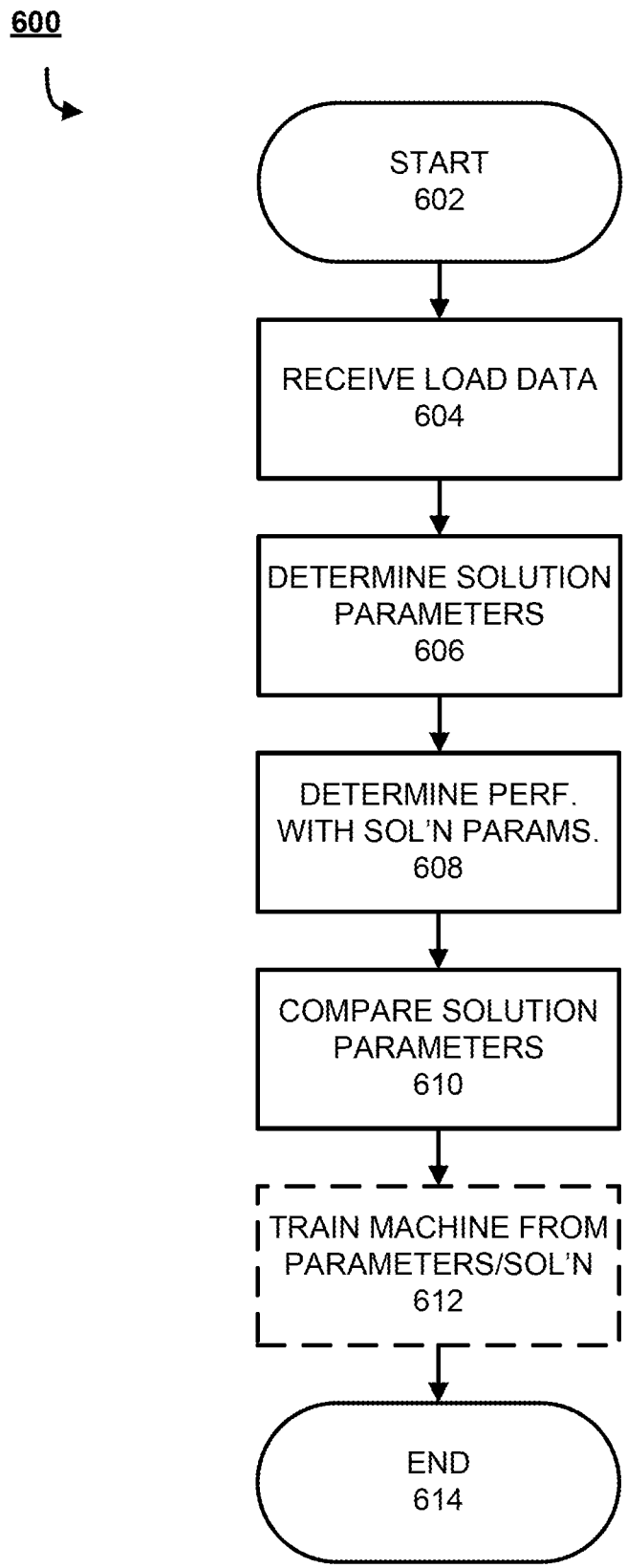
FIG. 6 is a flow chart of an example method in accordance with the disclosure.

FIG. 6 illustrates a flowchart of an alternative or complementary example methodology 600 for developing parameter solutions in call center networks. Methodology 600 begins at 602 and proceeds to 604 where load data related to real or simulated call center networks is received. Based on the load data and various equations (e.g., load balancing algorithms, routing algorithms, penalty functions), solution parameters are developed at 606.

The solution parameters are provided to a real or simulated call center network and at 608, network performance based on the solution parameters is determined. At 610, the calculated solution parameters can be compared to other solution parameters to determine relative error rates, penalties, performance, or efficiency. In embodiments, relative performance of solutions based on loads is stored in a database to assist with parameter lookup for simulation testing or real-world production environments at a later time.

In embodiments, this feedback, along with the calculated parameters themselves, is provided to a learning machine at

610 to train its machine learning or artificial intelligence. After this training, methodology 600 can end at 612.

Figure 7:
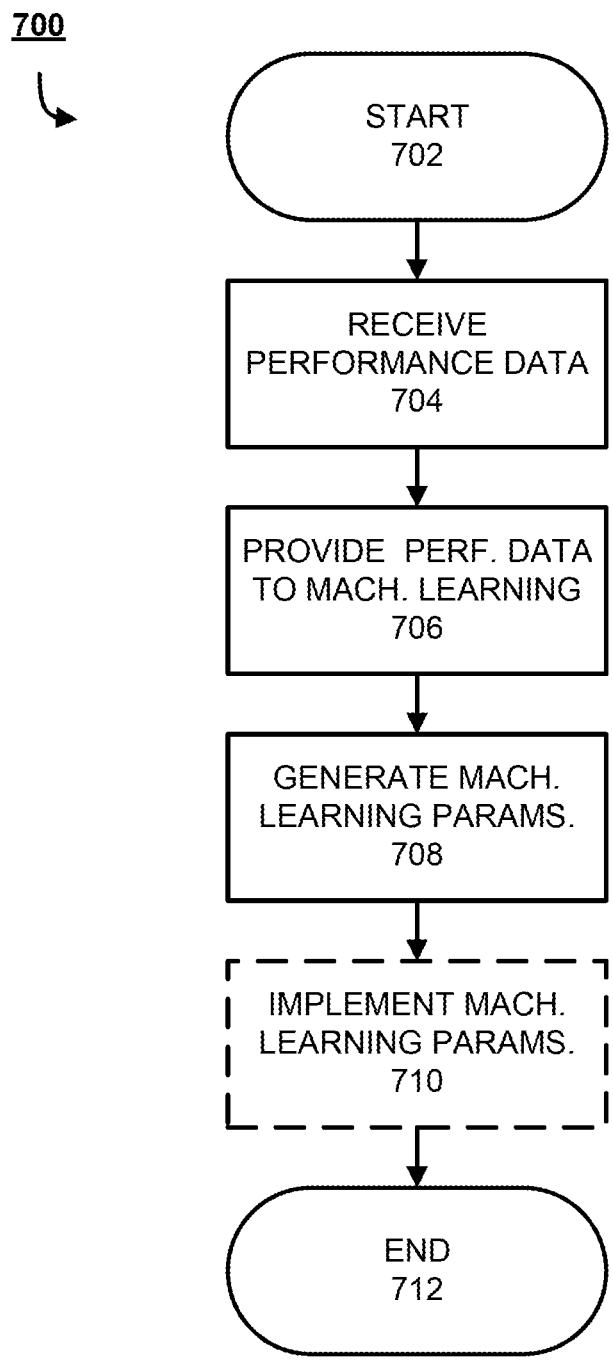
FIG. 7 is a flow chart of an example method in accordance with the disclosure.

FIG. 7 illustrates a flowchart of an alternative or complementary example methodology 700 for developing parameter solutions in call center networks. Methodology 700 begins at 702 and proceeds to 704 where performance data from real or simulated call center networks is received. The performance data is provided to a learning machine trained for handling call center load balancing, routing, and cost management at 706. In embodiments, this can be the same learning machine trained by methodology 600. Based on the performance data, methodology 700 generates or accesses solution parameters based on machine learning at 708. In embodiments, solution parameters developed or providing by the learning machine may be implemented at 710 by providing the solution parameters to real or simulated call center networks. Thereafter, at 712, methodology 700 ends.

In embodiments, methodology 700, or a related methodology, can include a bypass step before or after generating machine learning parameters (e.g., at 708). The bypass step can be provided to avoid determining solution parameters (e.g., 514 or 606) or performance given solution parameters (e.g., 608) where an objective function, penalty function, error function, or other function is difficult to solve based on complexity or changing parameters.

In embodiments, a unified method can combine methodologies 500, 600, and/or 700. In an embodiment, a determination can be made whether to bypass the calculations of methodology 500 and proceed immediately to methodology 700 utilizing machine learning. This determination to bypass (or not to bypass) can be based on a variety of factors, such as call volume, historical performance, loads on different machines or network resources, et cetera.

Methodologies herein are described with specific aspects for ease of explanation with respect to various embodiments. However, methodologies embraced under the scope and spirit of the disclosure may vary, to include excluding particular aspects or comparisons described.

As those skilled in the art will appreciate, one or more aspects of the systems, or implementations of methods, described herein may comprise any combination of hardware or software, one or more operating systems (e.g., Windows, OS, UNIX, Linux, Solaris, Android, or iOS), various conventional support software, or drivers typically associated with computers. Further, one or more of the aspects shown in, e.g., FIGS. 1 and/or 2 may include any suitable telephone, personal computer, network computer, workstation, minicomputer, mainframe, tablet, mobile device, or the like. One or more of the aspects shown in, e.g., FIGS. 1 and/or 2 may employ any type of database, such as relational, hierarchical, graphical, object-oriented, or other database configurations. Common database products that may be used include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition a database associated with one or more of the aspects shown in, e.g., FIGS. 1 and/or 2 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one example aspect, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Further, each data set may contain subsets of data that also may be distinct from other subsets.

As stated above, in various aspects of one or more of the aspects shown in, e.g., FIGS. 1 and/or 2, the data can be stored without regard to a common format. However, in one example aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, a transaction or membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. A data storage arrangement wherein the header or trailer, or header or trailer history, of the data may be stored on the transaction instrument in relation to the appropriate data. One skilled in the art will also appreciate that, for security reasons, any databases, systems, devices, servers, or other components of one or more of the aspects shown in, e.g., FIGS. 1 and/or 2 may comprise any combination thereof at a single location or at multiple locations, wherein each database or system includes any of various suitable security features, such as firewalls, access codes, encryption, decryption, compression, decompression, or the like.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A computer-implemented method, comprising:
   executing, using a processor, computer code stored on non-transitory computer readable media, wherein the computer code when executed effectuates operations comprising:
   receiving current loading parameters associated with a call center network;
   identifying a load balancing algorithm;
   determining, using machine learning trained from past performance data of the call center network, solution parameters for the load balancing algorithm based on the current loading parameters; and
   solving a penalty function based on the current loading parameters and the solution parameters.

2. The method of claim 1, wherein the operations further comprise:
   determining call center performance data based on the solution parameters, wherein the call center performance data is used in solving the penalty function.

3. The method of claim 2, wherein the call center performance data is generated from a model of one or more call centers.

4. The method of claim 3, wherein the operations further comprise:
   generating the model of the one or more call centers.

5. The method of claim 4, wherein the operations further comprise:
   generating model loading parameters for the model.

6. The method of claim 1, wherein the call center network has a call center network architecture, and wherein the call center network architecture utilizes two or more router types having two or more routing algorithms.

7. The method of claim 1, wherein the load balancing algorithm is based on an interactive voice response load balancer.

8. The method of claim 1, wherein the operations further comprise:
   comparing a solution to the penalty function with a plurality of additional penalty function solutions based on a plurality of additional solution parameters.

9. The method of claim 1, wherein the operations further comprise:
   providing the solution parameters to at least one call center network element, wherein a solution to the penalty function based on the solution parameters has a lower target deviation than that of at least one call center network element.

10. The method of claim 1, wherein the penalty function is five dimensional.

11. The method of claim 10, wherein dimensions include one or more of utilization rate, response time, abandonment rate, capture of high-propensity calls, and attribute matching.

12. The method of claim 1, wherein the load balancing algorithm is associated with two or more routing algorithms.

13. A system, comprising:
   a computer device connected to a network; and
   memory electronically coupled to the computer device, the memory comprising instructions that cause the computer device to effectuate operations for implementing:
   a call data module configured to receive current call center performance data associated with a call center network;
   a function module configured to identify a load balancing algorithm and a penalty function;
   a solver module configured to solve deviations based on the penalty function based on a network load and parameters associated with the load balancing algorithm; and
   a machine learning module configured to develop solution parameters for the load balancing algorithm based on the penalty function, wherein the machine learning module is trained on past performance data from the call center network.

14. The system of claim 13, wherein the network load is dynamic.

15. The system of claim 13, wherein the operations further implement:
a model module configured to generate a model of a call center network including two or more call centers.

16. The system of claim 15, wherein the operations further implement:
a load module configured to generate a plurality of simulated call loads to the model of the call center network.

17. The system of claim 13, wherein the penalty function includes two or more dimensions, wherein the two or more dimensions include utilization rate, response time, abandonment rate, capture of high-propensity calls, and attribute matching.

18. The system of claim 13, wherein the penalty function is five dimensional.

19. The system of claim 13, wherein the call center network has a call center network architecture, and wherein the call center network architecture utilizes two or more router types having two or more routing algorithms.

20. The system of claim 13, wherein the load balancing algorithm is based on an interactive voice response load balancer.

* * * * *

UNITED STATES PATENT AND TRADEMARK OFFICE
CERTIFICATE OF CORRECTION

PATENT NO. : 10,637,990 B1
APPLICATION NO. : 16/422138
DATED : April 28, 2020
INVENTOR(S) : Bipin Chadha and Lambros Petropoulos It is certified that error appears in the above-identified patent and that said Letters Patent is hereby corrected as shown below:

On the Title Page

Item (71) Applicant:
Delete "UIPCO, LLC" and Insert, --United Services Automobile Association (USAA)--

Signed and Sealed this
Sixth Day of October, 2020

Andrei Iancu
*Director of the United States Patent and Trademark Office*